Patented Dec. 12, 1933

1,939,422

UNITED STATES PATENT OFFICE 1,939,422

MIXED POLYMERIZATION PRODUCTS AND A PROCESS OF PREPARING THEM

Arthur Voss, Frankfort - on - the - Main, Ewald Dickhäuser, Gersthofen, near Augsburg, and Werner Starck, Hofheim-on-Taunus, Germany, assignors to I. G. Farbenindustrie Aktiengesellschaft, Frankfort-on-the-Main, Germany No Drawing. Application May 19, 1932, Serial No. 612,374, and in Germany December 24, 1930

14 Claims. (Cl. 260—2)

The present invention relates to mixed polymerization products and to a process of preparing them.

We have found that new valuable products are obtained by partially saponifying a product of the mixed polymerization of at least two different esters which contain the group $H_2C=C<$ and are capable of being polymerized and reacting upon the partially saponified mixture thus formed with aldehydes or ketones.

When starting from a mixed polymerization product of two different vinyl esters or a vinyl ester and an acrylic acid ester, there may first be obtained, depending on the conditions of the saponification applied, a product which still contains the one acid component, whereas the other acid component is split off, thus giving rise to the formation of a mixed polymerization product containing free hydroxyl groups. By the action of an aldehyde or a ketone upon such a product, there is obtained a mixed polymerization product, the hydroxyl groups of which are in part esterified and in part combined with the aldehyde or ketone to form an acetal. As is evident therefrom, the new process permits the preparation of mixed polymerization products containing various ester and acetal groups. By suitably selecting these groups, for instance, by combining in the same mixed polymerization product a higher fatty acid of at least 10 carbon atoms, such as oleic acid, in form of the ester, with an aldehyde, such as butyric aldehyde in form of the acetal, particularly in the proportion of about 1:10, the advantage is involved that the properties inherent to the higher fatty acid, such as excellent plasticity and fastness to water, are combined with the properties induced by the butyracetal group, i. e. an excellent elasticity and resistance to chemical or mechanical influences.

When starting from a mixed polymerization product of two vinyl esters, it is unnecessary first to isolate the products produced by saponification; they can directly be reacted upon with the aldehydes or ketones in the saponification mixture. Furthermore, the saponification and the formation of the acetal can be combined by simultaneously reacting with both agents upon the mixed polymerized ester.

It has been pointed out that practically all mixed polymerization products from different esters can be partially saponified the conditions to be applied depending on the nature of the acid components of the polyvinyl esters, higher acid groups being more resistant to acid saponifying agents than are lower acid groups.

The following examples serve to illustrate the invention, but they are not intended to limit it thereto, the parts being by weight:

(1) 100 parts of a highly viscous solution of a mixed polymerization product obtained by heating 72 parts of vinyl acetate, 8 parts of oleic acid vinyl ester, 0.8 part of benzoyl peroxide and 20 parts of alcohol are diluted with 200 parts of alcohol. To this solution 40 parts of butyraldehyde and 4 parts of sulfuric acid are added and the mass is heated to boiling, while stirring. After heating has been continued for 20 hours the separation of the acetyl residues and the simultaneous formation of the butyraldehyde acetal are complete. By precipitation with water, washing the acid from the precipitate and drying the latter under reduced pressure there is obtained a product of a light yellow color which is soluble in the usual solvents for lacquers and is particularly suitable for use as raw material for making a lacquer and for the production of plastic masses. The new product contains the oleic acid groups as well as butyraldehyde acetal groups.

(2) 150 parts of the mixed polymerization product obtained by the combined polymerization of vinyl acetate and vinyl chloride in molecular proportion are saponified in the presence of benzylnaphthalene sulfonic acid and a solvent, the acetyl group being separated. Without isolating the saponification product, 22 parts of paraformaldehyde are added and the whole is heated to boiling for 8 hours, while stirring. The reaction mass is then worked up by treating it with steam and drying it under reduced pressure. The product obtained is solid, resistant to heat, sparingly soluble in benzene and alcohol and readily soluble in mixtures of solvents. The new product is a mixed polymerization product of vinyl chloride and vinyl alcohol-formaldehyde-acetal.

(3) 130 parts of the mixed polymerization product from vinyl chloracetate and vinyl acetate are thoroughly comminuted into small pieces and suspended in a mixture of 300 parts of methanol and 150 parts of benzene, swelling occurring during this operation. 10 parts of sulfuric acid of 50 per cent. strength are then added. The mass is agitated at about 100° C. until it has completely dissolved, saponification having not yet occurred. 65 parts of cyclohexanone are then aded to the mixture which is kept for further 10 hours at this temperature. The acetyl group is saponified while addition of the ketone has simultaneously occurred, most of the chloracetyl residue being retained. The condensation product is isolated by precipitation with water, washing until free from acid and dried. It is a whitish, cellulose-like mass. The new product is a mixed polymerization product of vinyl chloracetate and vinyl alcohol-cyclohexanone-acetal.

(4) 150 parts of the product obtained by the combined polymerization of vinyl acetate and acrylic acid methyl ester are suspended in 800 parts of alcohol, while stirring. 5 parts of concentrated sulfuric acid and 44 parts of acetaldehyde are then added to the suspension and the whole is heated for 14 hours to boiling on the water bath. The reaction product can be precipitated with water and after washing the precipitate until free from acid and drying it under reduced pressure there is obtained a cellulose-like mass which is extremely resistant to heat and can readily be worked up to moulded articles.

The new product is a mixed polymerization product of acrylic acid ester and vinylalcohol acetaldehyde-acetal.

We claim:

1. The process which comprises partially saponifying the product of the mixed polymerization of vinyl acetate and vinyl esters of higher fatty acids of at least 10 carbon atoms and reacting upon the saponification product with an aldehyde.

2. The process which comprises partially saponifying a product of the mixed polymerization of vinyl acetate and vinyl oleate and simultaneously reacting with butyraldehyde upon the mixture so as to transform the hydroxyl groups formed by the saponification process into the butyraldehyde acetal.

3. The process which comprises partially saponifying a product of the mixed polymerization of vinyl acetate and vinyl chloride and reacting with paraformaldehyde upon the mixture thus obtained so as to transform the hydroxyl groups formed by the saponification process into the formaldehyde acetal.

4. The process which comprises partially saponifying a product of the mixed polymerization of vinyl acetate and vinyl chloracetate and simultaneously reacting with cyclohexanone upon the mixture so as to transform the hydroxyl groups formed by the saponification process into the cyclohexanone acetal.

5. The process which comprises partially saponifying a product of the mixed polymerization of at least two different esters which contain the group $H_2C=C<$ and are capable of being polymerized and reacting upon the saponification mixture thus formed with an organic compound containing the group $>C=O$ selected from the group consisting of ketones and aldehydes, so as to form an acetal.

6. The process which comprises partially saponifying a product of the mixed polymerization of at least two different esters which contain the group $H_2C=C<$ and are capable of being polymerized and simultaneously reacting upon the saponification mixture thus formed with an organic compound containing the group $>C=O$ selected from the group consisting of ketones and aldehydes, so as to form an acetal.

7. The process which comprises partially saponifying a product of the mixed polymerization of at least two different vinylesters and reacting upon the saponification mixture thus formed with an organic compound containing the group $>C=O$ selected from the group consisting of ketones and aldehydes, so as to form an acetal.

8. The products which are obtained by partially saponifying a product of the mixed polymerization of at least two different esters which contain the group $H_2C=C<$ and are capable of being polymerized and reacting upon the saponification mixture thus formed with an organic compound containing the group $>C=O$ selected from the group consisting of ketones and aldehydes, so as to form an acetal.

9. The products which are obtained by partially saponifying a product of the mixed polymerization of at least two different vinylesters and reacting upon the saponification mixture thus formed with an organic compound containing the group $>C=O$ selected from the group consisting of ketones and aldehydes, so as to form an acetal.

10. The products which are obtained by partially saponifying a product of the mixed polymerization of vinyl acetate and a vinyl ester of a higher fatty acid of at least 10 carbon atoms and reacting upon the saponification product with an aldehyde.

11. The products which are obtained by partially saponifying a product of the mixed polymerization of vinyl acetate and vinyl oleate and reacting upon the saponification product with an aldehyde.

12. The product which is obtained by partially saponifying a product of the mixed polymerization of vinyl acetate and vinyl oleate and reacting upon the saponification product with butyraldehyde.

13. The product which is obtained by partially saponifying a product of the mixed polymerization of vinyl chloracetate and vinylacetate and reacting upon the saponification product with formaldehyde.

14. The product which is obtained by partially saponifying a product of the mixed polymerization of vinylchloride and vinylacetate and reacting upon the saponification product with cyclohexanone.

ARTHUR VOSS.
EWALD DICKHÄUSER.
WERNER STARCK.